US008131766B2

(12) United States Patent
Idicula et al.

(10) Patent No.: US 8,131,766 B2
(45) Date of Patent: Mar. 6, 2012

(54) COMPREHENSIVE FRAMEWORK TO INTEGRATE BUSINESS LOGIC INTO A REPOSITORY

(75) Inventors: Sam Idicula, San Jose, CA (US);
Thuvan Hoang, Santa Clara, CA (US);
Asha Tarachandani, Newark, CA (US);
Nipun Agarwal, Santa Clara, CA (US);
Ravi Murthy, Fremont, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1844 days.

(21) Appl. No.: 11/014,442

(22) Filed: Dec. 15, 2004

(65) Prior Publication Data

US 2006/0143177 A1    Jun. 29, 2006

(51) Int. Cl.
*G06F 7/00* (2006.01)
(52) U.S. Cl. ......................................... 707/791; 707/802
(58) Field of Classification Search ........................ None
See application file for complete search history.

(56) References Cited

U.S. PATENT DOCUMENTS

| | | | |
|---|---|---|---|
| 5,047,918 A | 9/1991 | Schwartz et al. |
| 5,202,982 A | 4/1993 | Gramlich et al. |
| 5,210,686 A | 5/1993 | Jernigan |
| 5,257,366 A | 10/1993 | Adair et al. |
| 5,295,256 A | 3/1994 | Bapat |
| 5,307,490 A | 4/1994 | Davidson et al. |
| 5,369,763 A | 11/1994 | Biles |
| 5,388,257 A | 2/1995 | Bauer |
| 5,410,691 A | 4/1995 | Taylor |
| 5,454,101 A | 9/1995 | Mackay et al. |
| 5,463,772 A | 10/1995 | Thompson et al. |
| 5,467,471 A | 11/1995 | Bader |
| 5,493,682 A | 2/1996 | Tyra et al. |
| 5,499,371 A | 3/1996 | Henninger et al. |
| 5,504,892 A | 4/1996 | Atsatt et al. |
| 5,524,240 A | 6/1996 | Barbara et al. |
| 5,530,849 A | 6/1996 | Hanushevsky et al. |
| 5,544,360 A | 8/1996 | Lewak et al. |
| 5,546,571 A | 8/1996 | Shan et al. |
| 5,561,763 A | 10/1996 | Eto et al. |
| 5,566,331 A | 10/1996 | Irwin, Jr. et al. |

(Continued)

FOREIGN PATENT DOCUMENTS

EP    0 856 803 A2    8/1998
(Continued)

OTHER PUBLICATIONS

Herman Chung-Hwa Rao, et al., "An Overview of the Internet File System," 1997, IEEE, XP-002204711, pp. 474-477.

(Continued)

*Primary Examiner* — Tim T Vo
*Assistant Examiner* — Hasanul Mobin
(74) *Attorney, Agent, or Firm* — Hickman Palermo Truong & Becker LLP (57) ABSTRACT

Business logic is integrated within a repository through the use of "resource configurations." A resource configuration is a unit of business logic that is supplied by a user to the repository and associated with a particular directory and/or a resource. Each resource configuration contains one or more configuration items that each defines and/or expresses one or more business rules for managing a resource associated with the resource configuration.

20 Claims, 4 Drawing Sheets

U.S. PATENT DOCUMENTS

| | | | |
|---|---|---|---|
| 5,568,640 A | 10/1996 | Nishiyama et al. | |
| 5,574,915 A | 11/1996 | Lemon et al. | |
| 5,680,614 A | 10/1997 | Bakuya et al. | |
| 5,682,524 A | 10/1997 | Freund et al. | |
| 5,684,990 A | 11/1997 | Boothby | |
| 5,689,706 A | 11/1997 | Rao et al. | |
| 5,701,467 A | 12/1997 | Freeston | |
| 5,737,736 A | 4/1998 | Chang | |
| 5,758,153 A | 5/1998 | Atsatt et al. | |
| 5,778,179 A | 7/1998 | Kanai et al. | |
| 5,802,518 A | 9/1998 | Karaev et al. | |
| 5,819,275 A | 10/1998 | Badger et al. | |
| 5,822,511 A | 10/1998 | Kashyap et al. | |
| 5,825,353 A | 10/1998 | Will | |
| 5,832,526 A | 11/1998 | Schuyler | |
| 5,838,965 A | 11/1998 | Kavanagh et al. | |
| 5,842,212 A | 11/1998 | Ballurio et al. | |
| 5,848,246 A | 12/1998 | Gish | |
| 5,864,870 A | 1/1999 | Guck | |
| 5,878,415 A | 3/1999 | Olds | |
| 5,878,434 A | 3/1999 | Draper et al. | |
| 5,892,535 A | 4/1999 | Allen et al. | |
| 5,915,253 A | 6/1999 | Christiansen | |
| 5,917,492 A | 6/1999 | Bereiter et al. | |
| 5,918,225 A | 6/1999 | White et al. | |
| 5,921,582 A | 7/1999 | Gusack | |
| 5,937,406 A | 8/1999 | Balabine et al. | |
| 5,974,407 A | 10/1999 | Sacks | |
| 5,978,791 A | 11/1999 | Farber et al. | |
| 5,991,771 A | 11/1999 | Falls et al. | |
| 6,008,806 A | 12/1999 | Nakajima et al. | |
| 6,021,414 A | 2/2000 | Fuller | |
| 6,023,706 A | 2/2000 | Schmuck et al. | |
| 6,026,402 A | 2/2000 | Vossen et al. | |
| 6,029,160 A | 2/2000 | Cabrera et al. | |
| 6,029,166 A | 2/2000 | Mutalik et al. | |
| 6,029,175 A | 2/2000 | Chow et al. | |
| 6,052,122 A | 4/2000 | Sutcliffe et al. | |
| 6,052,785 A | 4/2000 | Lin et al. | |
| 6,055,527 A | 4/2000 | Badger et al. | |
| 6,088,694 A | 7/2000 | Burns et al. | |
| 6,092,086 A | 7/2000 | Martin et al. | |
| 6,101,500 A | 8/2000 | Lau | |
| 6,111,578 A | 8/2000 | Tesler | |
| 6,112,209 A | 8/2000 | Gusack | |
| 6,115,741 A | 9/2000 | Domenikos et al. | |
| 6,119,118 A | 9/2000 | Kain, III et al. | |
| 6,128,610 A | 10/2000 | Srinivasan et al. | |
| 6,182,121 B1 | 1/2001 | Wlaschin | |
| 6,185,574 B1 | 2/2001 | Howard et al. | |
| 6,192,273 B1 | 2/2001 | Igel et al. | |
| 6,192,373 B1 | 2/2001 | Haegele | |
| 6,208,993 B1 | 3/2001 | Shadmon | |
| 6,212,512 B1 | 4/2001 | Barney et al. | |
| 6,212,557 B1 | 4/2001 | Oran | |
| 6,230,310 B1 | 5/2001 | Arrouye et al. | |
| 6,233,729 B1 | 5/2001 | Campara et al. | |
| 6,236,988 B1 | 5/2001 | Aldred | |
| 6,247,024 B1 | 6/2001 | Kincaid | |
| 6,279,005 B1 | 8/2001 | Zellweger | |
| 6,279,007 B1 | 8/2001 | Uppala | |
| 6,301,605 B1 | 10/2001 | Napolitano et al. | |
| 6,314,408 B1 | 11/2001 | Salas et al. | |
| 6,321,219 B1 | 11/2001 | Gainer et al. | |
| 6,330,573 B1 | 12/2001 | Salisbury et al. | |
| 6,339,382 B1 | 1/2002 | Arbinger et al. | |
| 6,349,295 B1 | 2/2002 | Tedesco et al. | |
| 6,366,921 B1 | 4/2002 | Hansen et al. | |
| 6,366,988 B1 | 4/2002 | Skiba et al. | |
| 6,370,537 B1 | 4/2002 | Gilbert et al. | |
| 6,370,548 B1 | 4/2002 | Bauer et al. | |
| 6,389,427 B1 | 5/2002 | Faulkner | |
| 6,389,433 B1 | 5/2002 | Bolosky et al. | |
| 6,393,435 B1 | 5/2002 | Gartner et al. | |
| 6,393,456 B1 * | 5/2002 | Ambler et al. ............. 709/200 | |
| 6,397,231 B1 | 5/2002 | Salisbury et al. | |
| 6,421,692 B1 | 7/2002 | Milne et al. | |
| 6,427,123 B1 | 7/2002 | Sedlar | |
| 6,438,550 B1 | 8/2002 | Doyle et al. | |
| 6,442,548 B1 | 8/2002 | Balabine et al. | |
| 6,446,091 B1 | 9/2002 | Noren et al. | |
| 6,457,007 B1 | 9/2002 | Kikuchi et al. | |
| 6,457,065 B1 | 9/2002 | Rich et al. | |
| 6,487,469 B1 | 11/2002 | Formenti | |
| 6,487,552 B1 | 11/2002 | Lei et al. | |
| 6,493,742 B1 | 12/2002 | Holland et al. | |
| 6,532,488 B1 | 3/2003 | Ciarlante et al. | |
| 6,549,916 B1 | 4/2003 | Sedlar | |
| 6,587,873 B1 | 7/2003 | Nobakht et al. | |
| 6,594,675 B1 | 7/2003 | Schneider | |
| 6,604,100 B1 | 8/2003 | Fernandez et al. | |
| 6,611,843 B1 | 8/2003 | Jacobs | |
| 6,636,845 B2 | 10/2003 | Chau et al. | |
| 6,681,221 B1 | 1/2004 | Jacobs | |
| 6,697,805 B1 | 2/2004 | Choquier et al. | |
| 6,725,212 B2 | 4/2004 | Couch et al. | |
| 6,959,416 B2 * | 10/2005 | Manning et al. ............ 715/513 |
| 7,031,956 B1 | 4/2006 | Lee et al. | |
| 7,043,472 B2 * | 5/2006 | Aridor et al. ...................... 707/3 |
| 7,047,253 B1 | 5/2006 | Murthy et al. | |
| 7,051,039 B1 | 5/2006 | Murthy et al. | |
| 7,117,216 B2 * | 10/2006 | Chakraborty et al. ........ 707/100 |
| 2001/0054042 A1 | 12/2001 | Watkins et al. | |
| 2002/0056025 A1 | 5/2002 | Qiu et al. | |
| 2002/0073019 A1 | 6/2002 | Deaton | |
| 2002/0073056 A1 | 6/2002 | Broster et al. | |
| 2002/0099687 A1 | 7/2002 | Krishnaprasad et al. | |
| 2002/0103829 A1 | 8/2002 | Manning et al. | |
| 2002/0116457 A1 | 8/2002 | Eshleman et al. | |
| 2002/0120858 A1 | 8/2002 | Porter et al. | |
| 2002/0133484 A1 | 9/2002 | Chau et al. | |
| 2002/0138617 A1 | 9/2002 | Christfort et al. | |
| 2002/0184401 A1 | 12/2002 | Kadel, Jr. et al. | |
| 2002/0188613 A1 | 12/2002 | Chakraborty et al. | |
| 2003/0004937 A1 | 1/2003 | Salmenkaita et al. | |
| 2003/0014397 A1 | 1/2003 | Chau et al. | |
| 2003/0065659 A1 | 4/2003 | Agarwal et al. | |
| 2003/0084056 A1 | 5/2003 | DeAnna et al. | |
| 2003/0101194 A1 | 5/2003 | Rys et al. | |
| 2003/0131051 A1 | 7/2003 | Lection et al. | |
| 2003/0140308 A1 | 7/2003 | Murthy et al. | |
| 2003/0195865 A1 | 10/2003 | Long et al. | |
| 2003/0200197 A1 | 10/2003 | Long et al. | |
| 2004/0043758 A1 | 3/2004 | Sorvari et al. | |
| 2004/0064466 A1 | 4/2004 | Manikutty et al. | |
| 2004/0103282 A1 | 5/2004 | Meier et al. | |
| 2004/0148278 A1 | 7/2004 | Milo et al. | |
| 2004/0176958 A1 | 9/2004 | Salmenkaita et al. | |
| 2004/0205551 A1 | 10/2004 | Santos | |
| 2004/0225680 A1 | 11/2004 | Cameron et al. | |
| 2004/0267760 A1 | 12/2004 | Brundage et al. | |
| 2005/0289125 A1 | 12/2005 | Liu et al. | |
| 2006/0026286 A1 | 2/2006 | Lei et al. | |
| 2006/0047646 A1 | 3/2006 | Maluf et al. | |
| 2006/0129584 A1 | 6/2006 | Hoang et al. | |
| 2011/0137963 A1 | 6/2011 | Hoang et al. | |

FOREIGN PATENT DOCUMENTS

| | | |
|---|---|---|
| WO | WO 97/46956 A1 | 12/1997 |
| WO | WO 00/14632 A1 | 3/2000 |
| WO | WO 00/49533 A2 | 8/2000 |
| WO | WO 01/59602 | 8/2001 |
| WO | WO 01/61566 | 8/2001 |

OTHER PUBLICATIONS

Oracle Corporation, "Oracle® iFS (Internet File System," Technical Data Sheet, Mar. 1999, XP-002204710, pp. 1-3.

Ricardo, Catherine, Database Systems: Principles, Design, & Implementation, 1990, MacMillian Publishing co., pp. 357-361, 379-380.

Bourret, R. et al., "A Generic Load/Extract Utility for Data Transfer Between XML Documents and Relational Databases," Proc. Second International Workshop on Advanced Issues of E-Commerce and Web-Based Information Systems, IEEE Computing Socitey, Jun. 8-9, 2000, pp. 134-143.

Chae, Mi-Ok et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Cheng, Josephine et al., "IBM DB2 XML Extender," IEEE, ICDE '00 Conference, San Diego, Feb. 2000, 139 pages.

Jajodia, Sushil et al., "Toward a Multilevel Secure Relational Data Model," ACM, 1991, 8393 SIGMOD Record, Jun. 20, 1991, No. 2, New York, US, XP 000364619, pp. 50-59.

Noser, Hansrudi et al., Dynamic 3D Visualization of Database-Defined Tree Structures on the WWW by Using Rewriting Systems, 2000, IEEE, XP-002262516, pp. 247-254.

Vorthmann, Scott et al. "Beyond Schemas, Schema Adjuncts and the Outside World," Markup Languages, Online!, vol. 2, No. 3, Jun. 2000, pp. 1-8.

Al-Khalifa, Shurug et al., "Structural Joins: A Primitive for Efficient XML Query Pattern Matching", Feb. 26-Mar. 1, 2002, Data Engineering, 2002. Proceedings. 18th International Conference, pp. 141-152.

Braga, Daniele et al., "A Graphical Environment to Query XML Data with Query," Proceedings of the Fourth International Conference on Web Information Systems Engineering (WISE '03), 2003, IEEE, 10 pages.

Chakraborty, Krishnendu, "The XML Garbage Collector", The Source for Developers, Sun Developer Network Site XP-002297849, Mar. 2002, [online], retrieved Apr. 14, 2005, retrieved from the internet: < URL: http://developers.sun.com/solaris/articles/xml_garbage_collector.html>, pp. 1-6.

Chen, Ruey-Shun et al., "Developing an XML framework for metadata system", Trinity College Dublin, Proc. Of the 1st Inter. Sympo. on Information and Communication, pp. 267-272.

Current claims in PCT/US03/35551, pp. 20-23.

Manolescu, Dragos, Review of "Metadata solutions: using metamodels, repositories, XML, and enterprise portals to generate information on demand by Adrienne Tannebaum", Mar. 2003, ACM Press, vol. 28, Issue 2, p. 38.

Written Opinion, Application No. PCT/US03/35551 (8 pages).

International Searching Authority, "Notification of Transmittal of the International Search Report and the Written Opinion of the International Searching Authority, or the Deceleration," PCT/US2006/039706, dated Feb. 22, 2007, 13 pages.

Current Claims PCT/US2006/039706, 4 pages.

Arnold-Moore, Tim et al., "Architecture of a Content Management Server for XML Document Application," Web information Systems Engineering 2000, IEEE Computer Society—vol. 1, Jun. 19, 2000, XP010521842, pp. 97-108.

Sato, Hiroyuki et al., "Hyperclip: A Tool for Gathering and Sharing Meta-Data on User's Activities by Using Peer-to-Peer Technology," NTT Corporation—May 2002, retrieved from the internet at http://www.cs.rutgers.edu/{shklar/www11/final-submissions/paper12.pdf, retrieved on Jan. 29, 2007, 5 pages.

Wilde, Erik et al., "From Content-centered Publishing to a Link-based View of Information Resources," Proceedings of the 33rd Annual Hawaii International Conference—Jan. 4-7, 2000, XP010545318, pp. 1-10.

Wollschlaeger, Martin et al., "XML based Description Model as a Platform for Web-based Maintenance," Industrial Informatics Conference 2004, XP010782616, pp. 125-130.

"Power Schemas with Stylus Studio," Whitepaper published by Sonic Software Corporation, Jan. 2004.

U.S. Appl. No. 11/014,502, filed Dec. 15, 2004, Office Action, Mailing Date Sep. 20, 2009.

U.S. Appl. No. 12/276,182, filed Nov. 21, 2008, Final Office Action, Mailing Date Sep. 22, 2011.

U.S. Appl. No. 13/026,131, filed Feb. 11, 2011, Final Office Action, Mailing Date Oct. 5, 2011.

* cited by examiner

FIG. 1

Resource Configuration 201

```
<ResConfig xmlns= "http://xmlns.oracle.com/xdb/XDBResConfig.xsd"
  xmlns:xsi= "http://www.w3.org/2001/XMLSchema-instance"
  xsi:schemaLocation= "http://xmlns.oracle.com/xdb/XDBResConfig.xsd
  http://xmlns.oracle.com/xdb/XDBResConfig.xsd">

<defaultChildConfig>
     <configuration>
       <path>/sys/resconfigs/rcl.xml</path>
     </configuration>
   </defaultChildConfig>

</ResConfig>
```

FIG. 2

Resource Configuration 301

```xml
<ResConfig xmlns="http://xmlns.oracle.com/xdb/XDBResConfig.xsd"
    xmlns:xsi="http://www.w3.org/2001/XMLSchema-instance"
    xsi:schemaLocation="http://xmlns.oracle.com/xdb/XDBResConfig.xsd
    http://xmlns.oracle.com/xdb/XDBResConfig.xsd">

<event-listeners default-language="Java" default-schema="IFS">
    <listener>
      <description>Category application</description>
      <schema>CM</schema>
      <source>oracle.cm.category</source>
      <events>
        <Post-LinkIn/>
        <Post-UnlinkIn/>
        <Post-Update/>
      </events>
      <pre-condition>
          <existsNode>
            <XPath>/Resource[ContentType="image/gif"]</XPath>
          </existsNode>
      </pre-condition>
    </listener>
  </event-listeners>
<defaultChildACL>
    <ACL>
        <path>/sys/acls/ro_all_acl.xml</path>
    </ACL>
</defaultChildACL>

</ResConfig>
```

COMPREHENSIVE FRAMEWORK TO INTEGRATE BUSINESS LOGIC INTO A REPOSITORY

RELATED CASES

The present invention is related to U.S. patent application Ser. No. 11/014,502, entitled Performing An Action In Response To A File System Event, filed on the equal day herewith by Thuvan Hoang, et al., the contents of which are incorporated herein by reference and is herein referred to as the "Event Listener application".

FIELD OF THE INVENTION

The present invention relates to repository management, and in particular, to ways of facilitating integration of user-supplied rules with a repository.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

With the advent of computer systems, various techniques are evolving for storing and organizing electronic information. The most ubiquitous of these is the hierarchical file system. In a hierarchical file system, data is stored as a unit of data referred to as a file. Files are stored in persistent storage, such as a disk system. The files are hierarchically organized; a typical file system has directories arranged in a hierarchy, and documents that are contained in the directories.

Typically a file system is an integrated component of an operating system. The operating system provides functions for managing the files in the file system. For example, an operating system provides utilities for copying and deleting and controlling access to the files.

Repository

A repository is a computer system that stores and manages access to "resources". Specifically, a repository is a combination of integrated software components and an allocation of computational resources, such as memory, disk storage, a computer, and processes on the node for executing the integrated software components on a processor, the combination of the software and computational resources being dedicated to managing storage and access to resources.

A resource is a data source. The term resource encompasses a broad range of kinds of data sources. A resource can not only be a file, but also a XML document, including one stored in a file or stored in the tables of a relational database system. A resource may also be a CGI script, that, when executed, dynamically generates data.

Similar to a hierarchical file system, resources in a repository are organized according to a hierarchy referred to herein as a resource hierarchy. Each file may be located or identified by tracing a "path" through the hierarchy to the resource. For a given resource, a path begins at a root directory and proceeds down a hierarchy of directories to eventually arrive at the directory that contains the resource. A repository may associate more than one path with a resource.

A repository is typically part of a n-tier system, where the repository is in the first tier and one or more applications are in the outer tier. An application, as the term is used herein, is a unit of software that is configured to interact with and use the functions of a repository. In general, applications are comprised of integrated functions and software modules (e.g. programs comprised of machine executable code or interpretable code, dynamically linked libraries) that perform a set of related functions. The applications are configured to interact with a repository by establishing a connection to the repository through one or more interface components configured for interfacing to the repository. Often, but not necessarily, an application and repository are located on different computers; the connection to the repository includes a network connection to the repository.

Unlike a file system, a repository manages resources based on the content of the resource. For example, for a particular directory, a repository may only allow resources that contain certain types of data to be located within the directory, types such a XML document, or a XML document that conforms to a particular XML schema.

In addition, a repository may be customized through integration of business rules. Business rules are rules made by users of the repository for how a repository should manage resources on behalf of an application. Business rules include rules for how to respond to repository events, events such as accessing a resource, creating a resource in a particular directory, or moving a resource between directories. For example, a business rule may require that only documents with a particular content (e.g. XML documents, images) can be located at a particular directory. When a XML document is added to a particular directory, a business rule may require shredding a XML document (that is, break down the document into its constituent parts, e.g. elements, attributes) and store a representation of the document in an object-relational database system.

A repository may also integrate a more robust set of functions than is typically available with hierarchical file systems. A repository may provide the ability for versioning of resources, or a categorization engine that categorizes the resources.

Integrating Business Rules and Logic

Business rules are expressed by and/or implemented in business logic. Business logic refers to data, including code and instructions, that describe and/or define business rules and that control how the repository manages resources. Business logic is not native to the repository, but is instead supplied and/or input by users of the repository. Native code or data of a repository typically is developed by vendors of repositories.

There are various ways of integrating business rules and logic. The first is the single-application approach. Under this approach, one application, with unfettered access to a repository, substantially contains all the business logic for the business rules. For example, an application, with unfettered access to a repository, is configured to control what directories may be accessed by users or modules of the application. A drawback to this approach is that it does not facilitate sharing and partitioning access to the repository between multiple applications. Any application using a repository may access the resources of another application—a very undesirable situation from a security point of view.

This approach is also impractical to implement when use of third party applications is desired. It is impractical to customize a third party application in order to implement the business rules of a particular customer.

Another approach is the event-callout approach. Under this approach, a user supplies and registers callback routines that are called when certain repository events occur. The callback routines implement business logic and supply output values that indicate to the repository how the repository should manage or respond to the event. An advantage of this approach is its flexibility; a wide range of policies may be implemented using computer code. A disadvantage of this approach is its inefficiency. It involves a callout to a callback routine, which may reside within an application. Further, the repository, which has knowledge of how a repository is implemented, has no knowledge or control of how business logic is implemented in the callout routines, and is therefore unable to optimize how the repository is organized or optimize implementation and/or execution of business logic. Furthermore, the implementers of callback routines have limited knowledge of the repository design and configuration, and are less able to optimize callback routines for use with the repository.

Based on the foregoing, there is clearly a need for a new way to integrate business rules within a repository.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for integrating business rules within a repository. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described for integrating business logic through the use of "resource configurations". A resource configuration is a unit of business logic that is supplied, at least in part, by a user to the repository and is associated with a particular resource, such as a directory. Each resource configuration contains one or more configuration items that each defines and/or expresses one or more business rules for managing a resource associated with a resource configuration.

A resource configuration enables a user to "declaratively" and/or "programmatically" integrate business rules within a repository. A business rule is declaratively integrated within a repository by supplying business logic that conforms to a format or syntax recognized by the repository for expressing business rules and operations for managing resources in the repository. The business logic may take the form of values assigned or associated with particular attributes recognized by the repository to mean that a resource should be managed in a particular way. The business logic can also take the form of code that conforms to a computer language like syntax that specifies instructions for performing operations within a repository. The repository interprets, evaluates, and/or analyzes declaratively provided business logic to carry out the business rule expressed by the business logic.

A business rule is programmatically integrated within a repository by specifying, within a resource configuration, a callback routine and an event that triggers invocation of the callback routine. Such callback routines are referred to as event listeners. An event listener implements the business logic for handling a particular event. The output of an event-listener indicates to the repository how the repository should handle the event. Further details of event listeners and how a resource configuration may specify them can be found in the Event Listener application.

After defining the business rules in a resource configuration, a user can submit to the repository a command to associate a resource configuration to a directory or file in the repository. A resource that has been associated with a resource configuration is referred to herein as an associated resource.

Each time a repository operation acts upon a resource, the repository carries out the business rule specified in a configuration item of a resource configuration associated with the resource. For example, a configuration item of a resource configuration associated with a resource may specify a list of users who may access the resource. The configuration item is carried out, when, based on the configuration item, the repository limits access to the resource to those on the list.

Illustrative Repository with Resource Configuration

Figure 1:
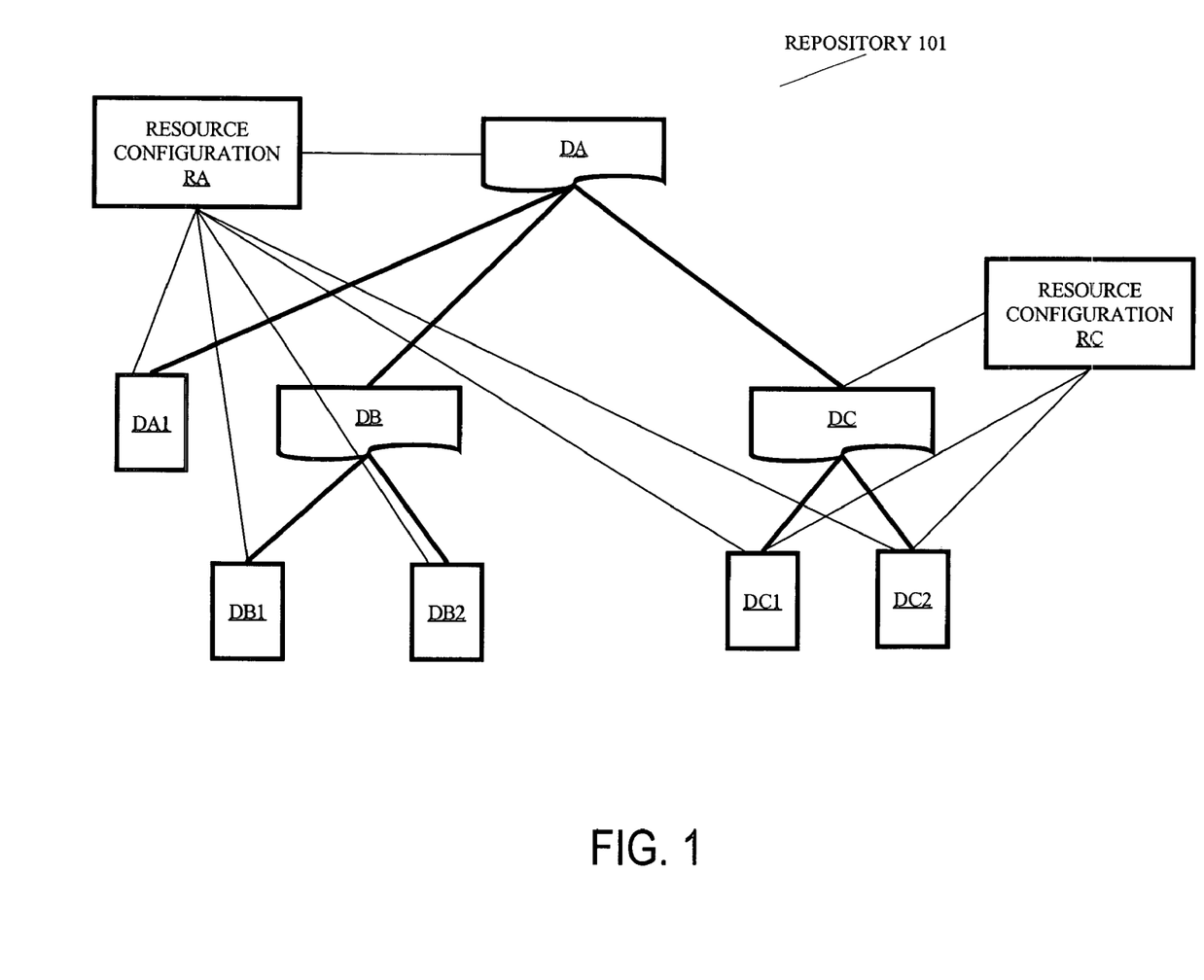
FIG. 1 is a diagram of a repository that stores a hierarchy of resources according to an embodiment of the present invention.

FIG. 1 is a block diagram depicting a repository and resource configuration used to illustrate an embodiment of present invention. Repository 101 includes hierarchically related resources directories DA, DB, and DC, and files DA1, DB1, DB2, DC1, and DC2. Directory DA contains directory DB, DC, and file DA1. Directory DB contains files DB 1 and DB2. Directory DC contains files DC1 and DC2.

As shall be described in greater detail, an association between a resource and a resource configuration may be based on the resource's position in the hierarchy of resources. Therefore, a description of terminology used to describe hierarchical relationships in a hierarchy of resources is useful. File DB1 descends from directory DB and directory DA. DB1, however, directly descends from directory DB because there is no other directory in path between directory DB and file DB1. Therefore, DB1 is referred to herein as a child of, an immediate descendent of, or as immediately descending from directory DB1. With respect to both DA and DB, DB1 may also be referred to as descendant of or as descending from both DA or DB. With respect to file DB1, DB is referred to an immediate ascendant, while both DA and DB may be referred to as an ascendant of DB1. Note also DA and DB may also be referred to as containing DB1.

A subtree is used to refer to a directory and its descendants, where the directory has an ascendant. For example, the director DB and descendents, DB1 and DB2, form a subtree. DB has ascendant DA.

Associating Resource Configurations with Resources

Resource configurations may be associated with resources explicitly or inherently. To explicitly associate a resource configuration with a resource, a user submits to a repository a command that specifies the association. For example, a user may submit a command that identifies a resource and a resource configuration to associate with the resource, causing the repository to associate the resource with the resource configuration.

A resource may be associated with a resource configuration through "inheritance." Under inheritance, a resource configuration explicitly associated with a directory identifies one or more resource configurations that are to be inherited by a descendant of the directory. Specifically, a configuration item in the resource configuration explicitly associated with the directory, identifies a resource configuration that is to be inherited by descendants; the configuration item can specify more than one resource configuration, allowing descendents to inherit multiple resource configurations. When a descendant resource of the directory is created, the resource is associated with the resource configuration specified by the configuration item. In this way, a resource inherits a resource configuration. Once a resource configuration is inherited by a resource, their association persists even if the resource is moved within the repository hierarchy so that the resource is no longer a descendant of the directory from whom the resource configuration was inherited.

According to an embodiment, a resource configuration can be associated with the root directory of a repository. In this case, all the resources in the repository can inherit the same resource configuration that is associated with the root directory.

Figure 2:
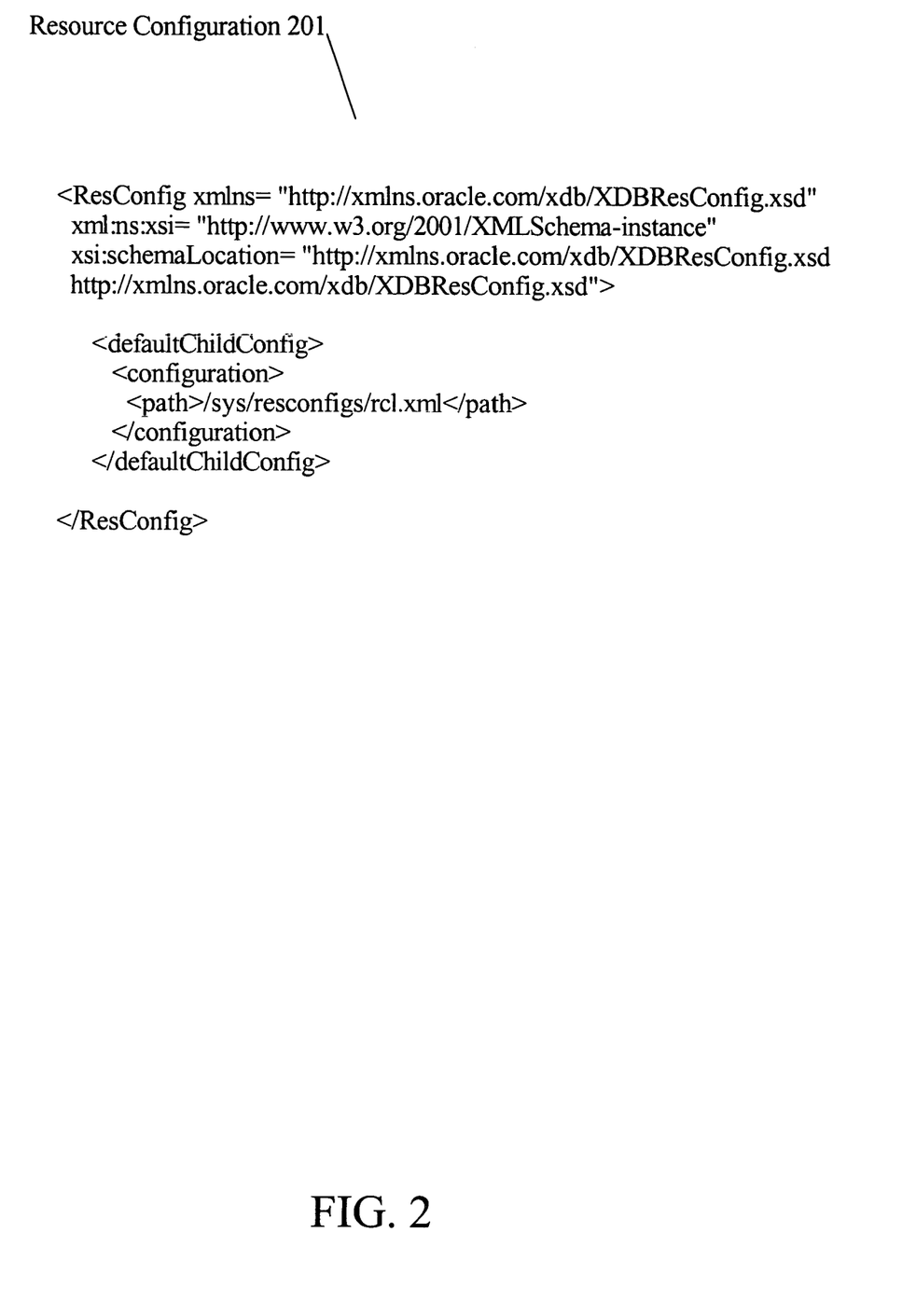
FIG. 2 is a diagram of a resource configuration according to an embodiment of the present invention.

FIG. 2 is a diagram depicting an illustrative resource configuration that identifies resource configurations inherited by descendants. Resource configuration 201 is a XML document that conforms to a XML schema. XML schemas are XML documents that contain information about the structure of specific types of XML documents. A format and standard for a XML schema is XML Schema, Part 0, Part 1, Part 2, W3C Recommendation, 2 May 2001, the contents of which are incorporated herein by reference. A particular advantage of using a XML document is that it can be human readable. The present invention, however, is not limited to resource configurations that conform to XML or that are human readable.

In resource configuration 201, the element <defaultChildConfig> is a configuration item for defining a default resource configuration to be inherited by descendants. The <configuration> element specifies that a resource configuration, named '/sys/resconfigs/rcl.xml', is to be inherited by the descendants.

Illustrative Declarative Rules

A resource configuration can be used to declaratively specify a variety of business rules for resources that have been associated with the resource configuration.

A resource configuration may specify constraints. For example, a configuration item may specify that a directory may only contain resources of a particular type.

A resource configuration can declare a default Access Control List ("ACL"). An ACL is a mapping between a list of users and types of access privileges assigned to them. For example, an element <defaultChildACL> specifies a default ACL to be assigned to a descendant when it is created. This consequently controls who can access the resource.

A resource configuration can define default properties for resources for when the resources are created. For example, an element <defaultChildConfig> can specify such default properties.

A configuration item may define a mapping of a file name extension to a Multipurpose Internet Mail Extensions ("MIME") type. Such mappings are referred herein to as MIME type mappings. The MIME type mappings of a resource configuration are applied to its associated resources. Thus, a resource with a particular file name extension that is mapped to a particular MIME type is treated by the repository as belonging to that MIME type. A MIME type is a data format recognized by the Internet Engineering Task Force. Examples of MIME types include GIF and PostScript.

These examples of what business rules may be made declaratively are illustrative and non-limiting. Therefore, it is understood that the present invention is not limited to the illustrative business rules expressly disclosed herein.

Pre-conditions: Each configuration item may be associated with a precondition. The precondition must be satisfied if the configuration item is to apply. This allows a configuration item to be applied to different types of resources, based on their type, and content and properties. The preconditions allow sets of business rules to be applied to different types of resources, independent of where the resources are located in the repository hierarchy. The preconditions can also be used to control which descendant resources inherit resource configurations from an ascendant directory Preconditions may be type-based. For example, satisfying a precondition may require that a resource be a particular type based on, for example, file name extensions, or MIME types, or whether the resource is an instance of a particular XML schema.

A file name extension is a string concatenated to another portion of a file name, and is delimited from the file name by punctuation such as a period. For example, in the file name "text.txt", the file name extension is "txt".

Pre-conditions may be content-based. For example, a precondition may require that a resource have an image resolution of 600 dpi, or that an XML document has a particular attribute value, e.g. that the attribute '/PO/RequesterID' in the XML document equals the value 'ACME'. According to an embodiment, a precondition identifies a property of a XML document resource using XPATH notation. XPath is described in XML Path Language (XPATH), version 1.0 (W3C Recommendation 16 Nov. 1999), which is incorporated herein by reference. XPath 2.0 and XQuery 1.0 are described in XQuery 1.0 and XPath 2.0 Full-Text, W3C Working Draft 9 Jul. 2004, which is incorporated herein by reference.

Illustrative Resource Configuration

Figure 3:
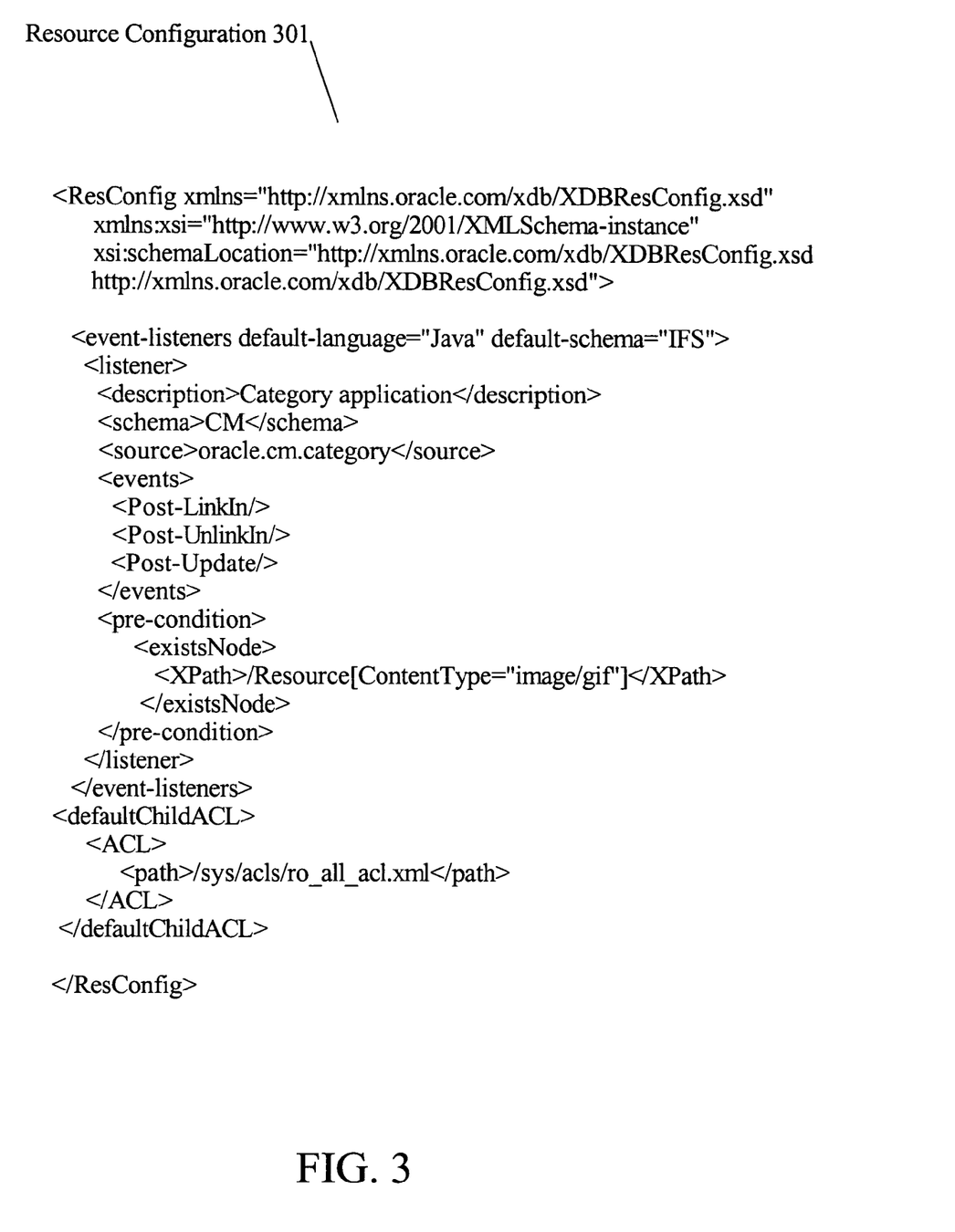
FIG. 3 is a diagram of a resource configuration according to an embodiment of the present invention.

FIG. 3 is a diagram depicting an illustrative resource configuration according to an embodiment of the present invention. Resource configuration 301 declares a default ACL and an event listener. Specifically, the element <defaultChildACL> is a configuration item that declarative specifies that the default ACL is '/sys/acls/ro_all_acl.xml' (see child element <ACL>).

The element <event-listeners> defines an event listener. The child element <events> contains elements that represent events to trigger the event listener. The element <pre-condition> specifies preconditions that must be satisfied in order to invoke an event listener for an associated resource. In this case, one pre-condition is defined. Element <existnodes> declaratively states that the associated resource must have an attribute ContentType='image.gif', or, in other words, the content type must be a GIF image file.

The approach described herein for integrating business rules combines the flexibility of implementing business rules programmatically with the power of being able to integrate business rules declaratively. Because the repository can interpret and understand declaratively provided business logic, the repository can optimize the way it carries out the business logic and/or organizes the repository. Further, the business logic may be executed more efficiently because a callback routine is not invoked to execute the business logic. Finally, an application may share a repository with another application without having to rely on another application, with unfettered access to the repository, to refrain from violating the security of the application. The security may be enforced internally within the repository through resource configurations provided on behalf of the application.

Hardware Overview

Figure 4:
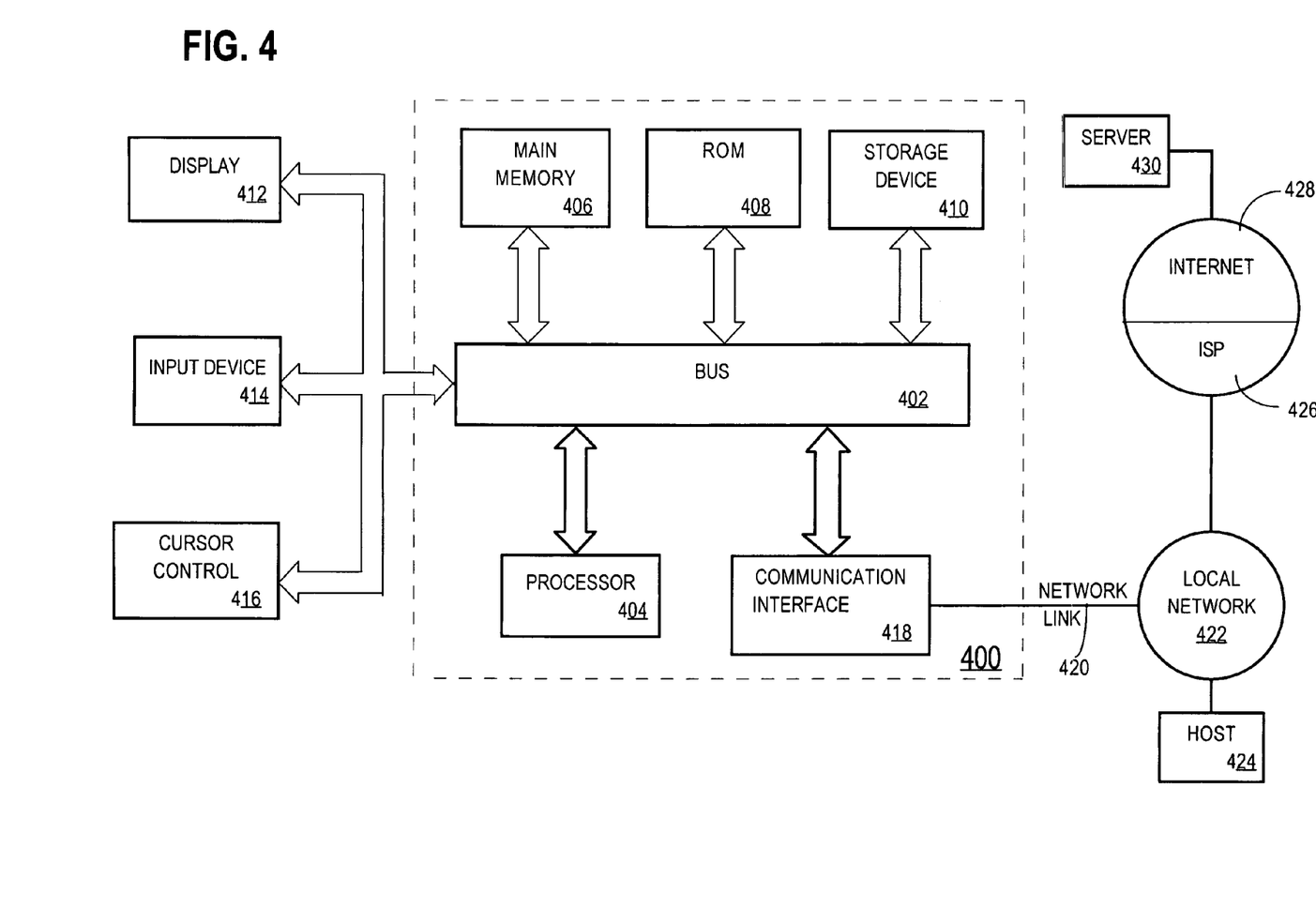
FIG. 4 is a block diagram that illustrates a computer system upon which an embodiment of the present invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing a hierarchy of resources in a repository, the method comprising:
receiving user input that associates a resource configuration with a directory within the hierarchy of resources stored in the repository, wherein the resource configuration is an XML document that declaratively defines one or more rules;
based on data in the resource configuration, associating the resource configuration with at least one resource within the hierarchy;
wherein the resource configuration contains a first configuration item that includes data that expresses the one or more rules in a format that can be interpreted by the repository;
wherein the resource configuration identifies a routine to call to determine how to manage a resource within the hierarchy in response to an event concerning the repository;
invoking the routine in response to the event;
the repository responding to the event based on output returned by invoking the routine;
interpreting the first configuration item; and
managing the resource based on the interpreting of the first configuration item.

2. The method of claim 1, wherein associating the resource configuration with at least one resource within the hierarchy is based on a position of the at least one resource within the hierarchy.

3. The method of claim 1, wherein associating the resource configuration with at least one resource within the hierarchy is based on the at least one resource being a descendant of the directory.

4. The method of claim 1, wherein the resource configuration contains data that explicitly associates a particular resource configuration with the at least one resource.

5. The method of claim 4, wherein explicitly associates a particular resource configuration with the at least one resource includes associating the resource configuration with a descendant of a directory with which the resource configuration is associated.

6. The method of claim 1, wherein associating the resource configuration with at least one resource within the hierarchy includes associating the resource configuration with a certain resource that belongs to a particular type.

7. The method of claim 6, wherein the particular type is based on one or more of the following:
a MIME type of the certain resource,
a file name extension of the certain resource,
a content of the certain resource, and
an XML schema of which the certain resource is an instance.

8. The method of claim 1, wherein the first configuration item specifies a precondition that must be satisfied when the first configuration item is to be applied.

9. The method of claim 1, wherein:
the resource configuration contains a mapping that maps a MIME type to at least one file name extension;
wherein the at least one resource is associated with a file name that includes the at least one file name extension; and
wherein managing the at least one resource includes the mapping causing the repository to manage the at least one resource based on the MIME type.

10. The method of claim 1, wherein the at least one resource includes the directory.

11. A non-transitory computer-readable storage medium carrying one or more sequences of instructions which, when executed by one or more processors, causes the one or more processors to perform the method recited in claim 1.

12. A non-transitory computer-readable storage medium carrying one or more sequences of instructions which when executed by one or more processors, causes the one or more processors to perform the method recited in claim 2.

13. A non-transitory computer-readable storage medium carrying one or more sequences of instructions which when executed by one or more processors, causes the one or more processors to perform the method recited in claim 3.

14. A non-transitory computer-readable storage medium carrying one or more sequences of instructions which when executed by one or more processors, causes the one or more processors to perform the method recited in claim 4.

15. A non-transitory computer-readable storage medium carrying one or more sequences of instructions which when executed by one or more processors, causes the one or more processors to perform the method recited in claim 5.

16. A non-transitory computer-readable storage medium carrying one or more sequences of instructions which when executed by one or more processors, causes the one or more processors to perform the method recited in claim 6.

17. A non-transitory computer-readable storage medium carrying one or more sequences of instructions which when executed by one or more processors, causes the one or more processors to perform the method recited in claim 7.

18. A non-transitory computer-readable storage medium carrying one or more sequences of instructions which, when executed by one or more processors, causes the one or more processors to perform the method recited in claim 8.

19. A non-transitory computer-readable storage medium carrying one or more sequences of instructions which, when executed by one or more processors, causes the one or more processors to perform the method recited in claim 9.

20. A non-transitory computer-readable storage medium carrying one or more sequences of instructions which, when executed by one or more processors, causes the one or more processors to perform the method recited in claim 10.

* * * * *

UNITED STATES PATENT AND TRADEMARK OFFICE
CERTIFICATE OF CORRECTION

| | | |
|---|---|---|
| PATENT NO. | : 8,131,766 B2 | Page 1 of 1 |
| APPLICATION NO. | : 11/014442 | |
| DATED | : March 6, 2012 | |
| INVENTOR(S) | : Idicula et al. | |

It is certified that error appears in the above-identified patent and that said Letters Patent is hereby corrected as shown below:

On page 2, in column 2, under "Other Publications", line 4, delete "MacMillian" and insert -- MacMillan --, therefor.

On page 2, in column 2, under "Other Publications", line 8, delete "Socitey," and insert -- Society, --, therefor.

On page 3, in column 1, under "Other Publications", line 33, delete "Tannebaum"," and insert -- Tannenbaum", --, therefor.

On page 3, in column 2, under "Other Publications", line 26, delete "Sep. 20, 2009." and insert -- Sep. 30, 2009. --, therefor.

In column 4, line 34, delete "DB 1" and insert -- DB1 --, therefor.

In column 5, line 54, delete "<defaultChildConfig>" and insert -- <defaultChildConfig> --, therefor.

In column 6, line 12, delete "directory" and insert -- directory. --, therefor.

In column 10, line 22, in Claim 12, delete "which when" and insert -- which, when --, therefor.

In column 10, line 26, in Claim 13, delete "which when" and insert -- which, when --, therefor.

In column 10, line 30, in Claim 14, delete "which when" and insert -- which, when --, therefor.

In column 10, line 34, in Claim 15, delete "which when" and insert -- which, when --, therefor.

In column 10, line 38, in Claim 16, delete "which when" and insert -- which, when --, therefor.

In column 10, line 42, in Claim 17, delete "which when" and insert -- which, when --, therefor.

Signed and Sealed this
Twenty-ninth Day of May, 2012

David J. Kappos
*Director of the United States Patent and Trademark Office*